United States Patent
Rheaume et al.

(10) Patent No.: US 10,532,311 B2
(45) Date of Patent: Jan. 14, 2020

(54) INERT GAS GENERATION WITH DEHUMIDIFICATION

(71) Applicant: Hamilton Sundstrand Corporation, Charlotte, NC (US)

(72) Inventors: Jonathan Rheaume, West Hartford, CT (US); Michael L. Perry, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 232 days.

(21) Appl. No.: 15/639,587

(22) Filed: Jun. 30, 2017

(65) Prior Publication Data

US 2019/0001264 A1    Jan. 3, 2019

(51) Int. Cl.
| | | |
|---|---|---|
| *B01D 53/32* | (2006.01) | |
| *B01D 53/26* | (2006.01) | |
| *C25B 1/04* | (2006.01) | |
| *B64D 37/32* | (2006.01) | |

(52) U.S. Cl.
CPC ......... *B01D 53/326* (2013.01); *B01D 53/265* (2013.01); *B01D 53/268* (2013.01); *B64D 37/32* (2013.01); *C25B 1/04* (2013.01)

(58) Field of Classification Search
CPC .. C25B 1/02–12; B01D 53/268; B01D 53/326
See application file for complete search history.

(56) References Cited

U.S. PATENT DOCUMENTS

| | | |
|---|---|---|
| 5,681,433 A | 10/1997 | Friesen et al. |
| 7,815,148 B2 | 10/2010 | Kwok |
| 8,568,934 B2 | 10/2013 | Naeve et al. |
| 8,978,264 B2 | 3/2015 | Stolte et al. |
| 9,130,204 B2 | 9/2015 | Hoffjann et al. |
| 9,174,740 B2 | 11/2015 | Stolte et al. |
| 2005/0279209 A1 | 12/2005 | Matsunaga |
| 2008/0282653 A1 | 11/2008 | Tempelman et al. |
| 2014/0004434 A1 | 1/2014 | Saballus et al. |
| 2014/0349214 A1 | 11/2014 | Oehme |
| 2015/0040986 A1 | 2/2015 | Tichborne et al. |
| 2015/0122814 A1 | 5/2015 | Tichborne et al. |
| 2015/0333347 A1 | 11/2015 | Brunaux et al. |
| 2016/0118679 A1 | 4/2016 | Joos et al. |
| 2016/0144973 A1 | 5/2016 | Darling et al. |

(Continued)

FOREIGN PATENT DOCUMENTS

| | | |
|---|---|---|
| EP | 3023518 A1 | 5/2016 |
| EP | 3181457 A1 | 6/2017 |
| EP | 3263187 A2 | 1/2018 |

OTHER PUBLICATIONS

Extended European Search Report for EP Application No. 18181199.3, dated Oct. 18, 2018, 9 pages.

(Continued)

*Primary Examiner* — Nicholas A Smith

(74) *Attorney, Agent, or Firm* — Kinney & Lange, P.A.

(57) ABSTRACT

A method of producing inert gas uses an electrochemical gas separator with a proton exchange membrane to produce oxygen-depleted air and a water vapor transport module to dehumidify oxygen-depleted air. A drying mechanism is leveraged in conjunction with the water vapor transport module to dry the oxygen-depleted air. The dried oxygen-depleted air is then used in a location requiring inerting.

14 Claims, 3 Drawing Sheets

(56) References Cited

U.S. PATENT DOCUMENTS

2016/0362191 A1    12/2016  Hoffjann
2018/0050300 A1*    2/2018  Rheaume ............. B01D 53/265

OTHER PUBLICATIONS

Richard W. Baker, "Membranes for Vapor/Gas Separation," Membrane Technology and Research Inc, 2006, pp. 1-25.
F. Oehme et al., "Undersuchungen an Einem Warmeubertrager Unter Entfeuchtungsbedingungen Fur Brennstoffzellen an Bord Von Passagierflugzeugen," Institut fur Thermodynamik, 2013.

* cited by examiner

INERT GAS GENERATION WITH DEHUMIDIFICATION

BACKGROUND

This disclosure relates to air inerting systems for aircraft, and more specifically to a method of inert gas management requiring dehumidification.

Aircraft fuel tanks can contain potentially combustible combinations of oxygen, fuel vapors, and ignition sources. In order to prevent combustion, the ullagez of fuel tanks and contained space is filled with inert air containing less than 12% oxygen. Conventional fuel tank inerting (FTI) methods include air separation module (ASM) methods that separate ambient air into nitrogen-enriched air, which is directed to fuel tanks and locations needing inerting, such as fire suppression systems, and oxygen-enriched air, which is rejected overboard. But ASM methods require pressurized air to produce dry oxygen-depleted air suitable for inerting.

As an alternative, proton exchange membrane (PEM) electrochemical gas separators can generate inert gas that is saturated with water vapor without bleeding an engine compressor stage. However, the water vapor must be removed if it is to be used for fuel tank inerting purposes, otherwise water in fuel tanks creates a plethora of problems, including degrading fuel quality, freezing and occluding fuel system passages, and feeding growth of microbes. Condensers are limited in their use for drying because the inert gas must be dried to a subfreezing equivalent dew point for condensers to remove enough water from inert air. Other previous methods use low pressure bleed air for hybrid PEM and ASM technology, but a solution to dry humid oxygen-depleted air produced in PEM devices that is independent of a pressurized supply of air is needed.

SUMMARY

A system for inerting gas includes an electrochemical gas separator configured to remove oxygen from air and produce oxygen-depleted air, a water vapor transport module configured to receive the oxygen-depleted air from the electrochemical gas separator and to dehumidify the oxygen-depleted air to produce dried oxygen-depleted air and water vapor, a drying mechanism downstream of the water vapor transport module, the drying mechanism configured to condense the water vapor and the dried oxygen-depleted air, and an inerting location configured to receive the dried oxygen-depleted air.

A method includes flowing air into an electrochemical gas separator, electrolyzing the water in the electrochemical gas separator to produce humid oxygen, humid oxygen-depleted air, and water, flowing the humid oxygen-depleted air to a water vapor transport module, dehumidifying the humid oxygen-depleted air in the water vapor transport module using a drying mechanism to produce dried oxygen-depleted air and water to produce dried oxygen-depleted air, and sending the dried oxygen-depleted air to a location requiring inerting.

DETAILED DESCRIPTION

The disclosed inert gas generation system leverages both a proton exchange membrane electrochemical gas separator (EGS) and water vapor transport (WVT) modules for creation of a dry, inert gas. While an EGS generates inert gas, the resulting oxygen-depleted air (ODA) from the cathode exhaust of the EGS is humid. WVT membranes dry inert gas exhaust so that the dried inert gas can be used for inerting purposes such as fuel tank inerting or fire suppression. Additionally, the water removed from the ODA by the WVT module may be returned to the EGS to minimize the make-up water required. Preferably, no make-up water is required, since the net water consumed and produced by the EGS is zero. The air supply for this system does not need to be substantially pressurized to accomplish dehumidification unless the inert gas will be used in a pressurized location such as a cargo hold in a fuselage during flight, thus, compressed air does not need to be used.

Figure 1:
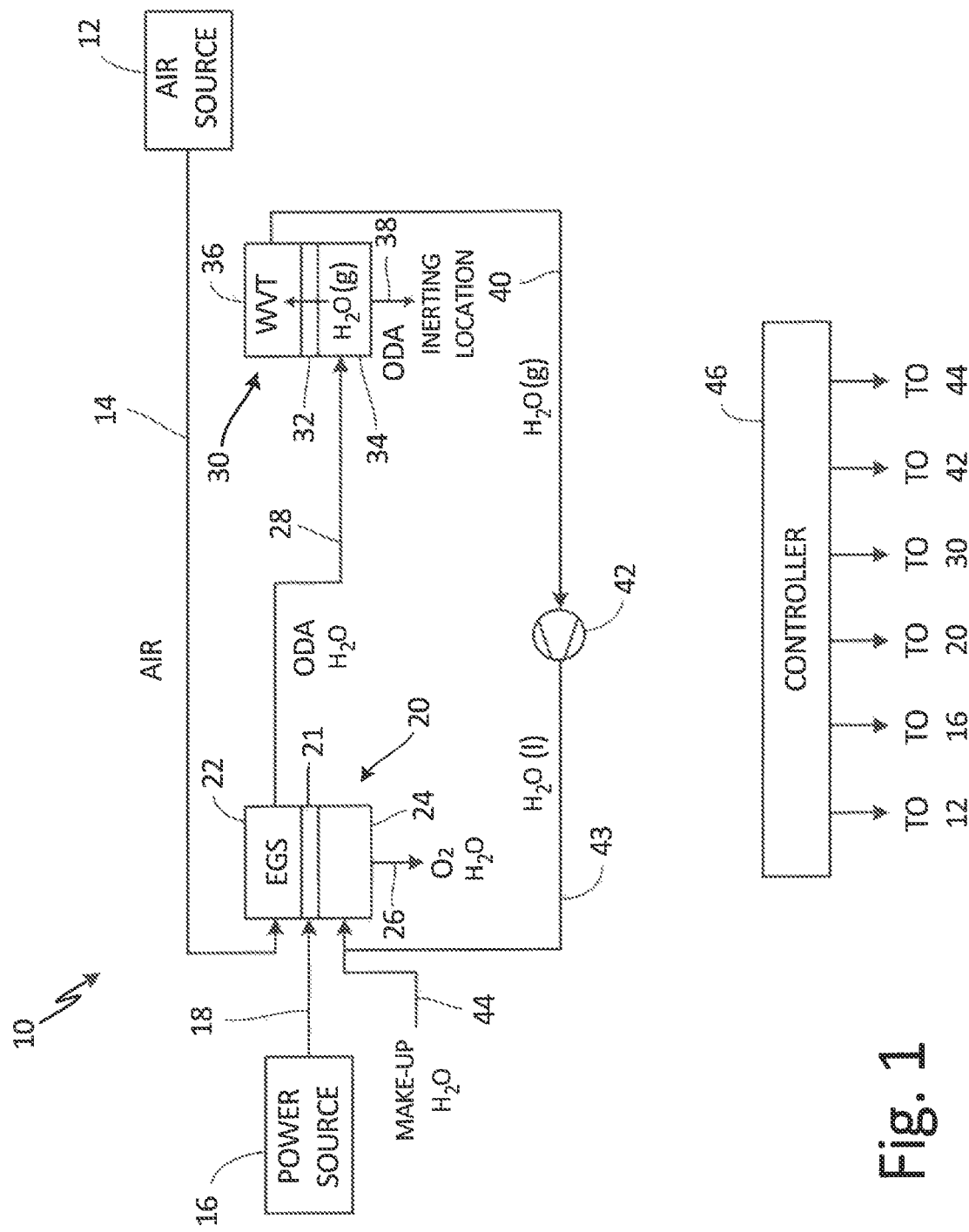
FIG. 1 is a schematic drawing of an inert gas generation and dehumidification system for aircraft.

FIG. 1 is a schematic drawing of inert gas generation and dehumidification system 10 for aircraft. System 10 includes air source 12, air source line 14, power source 16, power line 18, electrochemical gas separator (EGS) 20 (containing membrane 21, cathode 22, and anode 24), humid oxygen line 26, humid oxygen-depleted air (ODA) line 28, water vapor transport (WVT) module 30 (containing membrane 32, first side 34, and second side 36), dry ODA line 38, water vapor line 40, vacuum pump 42, water line 43, and make-up water line 44. System 10 is controlled by controller 46, which interacts with air source 12, power source 16, EGS 20, WVT module 30, vacuum pump 42, and make-up water line 44.

Electrochemical gas separator (EGS) 20 is a proton exchange membrane (PEM) device that contains membrane 21, separating cathode 22 and anode 24. EGS 20 may consist of a plethora of EGS cells arranged in a stack using interconnects and endplates as known to those skilled in the art. Similarly, EGS 20 may comprise several stacks that can be electrically connected in series or in parallel known by those skilled in the art. In the following, mention of membrane 21, cathode 22, and anode 24 refers to these elements collectively in EGS 20. EGS 20 takes in air ($N_2$ and $O_2$) from air source 12 and air source line 14, in addition to power from power source 16 and power line 18. Air source 12 does not need to be pressurized for system 10 to evolve dry, inert air for inerting purposes. Air source 12 can be pre-filtered (not shown) to prevent contaminants (such as particulates, hydrocarbon vapors, sulfur-containing species, or others) from reaching EGS 20.

Using air and power from 12 and 16 respectively, in addition to water from lines 43 or 44, EGS 20 produces humid oxygen-depleted air. At anode 24 of EGS 20, water is electrolyzed, producing oxygen and protons. The oxygen evolved exits on the side of anode 24 with water vapor through humid oxygen line 26. Humid oxygen can be fed to an aircraft cabin or flight deck, or other suitable location. Water vapor can optionally be recovered from the humid oxygen stream and reused by returning this water to the anode 24 of the EGS 22 or to the cathode 24 where it diffuses through membrane 21 to anode 24.

The protons generated at anode 24 migrate across membrane 21 of EGS 20 to cathode 22. At cathode 22 of EGS 20, air containing both nitrogen and oxygen is also supplied where the oxygen is reduced by the protons supplied by the anode. Oxygen is consumed in part or in full, and water is produced along with oxygen-depleted air (ODA). Some of the water generated by the oxygen-reduction reaction will be liquid, since the EGS is operated at temperature inferior to the boiling point of water, and this liquid water may remain in the EGS. This liquid water may back-diffuse to the anode, which tends to be dried out by the water being transported via electro-osmotic drag through the membrane 21 with the protons. The ODA that exits cathode 22 will also contain water, primarily vapor, goes through humid ODA line 28 and is directed to WVT module 30. EGS 20 can reduce oxygen content in incoming air down to less than 3% oxygen. Thus, further oxygen removal is not required for inerting applications. Exhaust exiting EGS 20 down line 28 is, however, humid. Hence, WVT module 30 is used to dehumidify inert air coming from EGS 20.

Water vapor transport (WVT) module 30 has first side 34 and second side 36 separated by membrane 32. WVT module 30 can have a countercurrent flow, crossflow, or any other flow arrangement depending on the geometry of membrane 32. WVT membrane geometries may be planar, spiral-wound, hollow fiber, or any other suitable form. In WVT module 30, moisture is transported from first side 34 to second side 36 through membrane 32 due to a difference in water vapor partial pressure levels, not due to an absolute pressure gradient, although an absolute pressure gradient may be present if a vacuum source is used to create the partial pressure gradient. The lack of pressure gradient requirement on either side of the membrane in WVT module 30 allows for lower-pressure air feed sources to be used as sweep gases in system 10. Thus, air source 12 could potentially be ambient (ram) air, fan air from a turbofan engine, or filtered cabin air or cargo-hold air among other sources.

Membrane 32 has selectively that favors the permeation of water vapor, a condensable vapor, over permanent gases such as oxygen and nitrogen. In one embodiment, membrane 32 allows transport of water preferentially due to a difference in sorption of permanent gases. Various materials and configurations can be utilized for membrane 32. Water molecules are both much smaller and more condensable than oxygen or nitrogen. Thus, the selective permeation of water can be accomplished with many types of polymer based membranes, for example, polyimides known for use in dehydration applications, 2,2-bistrifluromethyl-4,5-difluoro-1,3-dixole/tetrafluoroethylene, silicone rubbers (for example, polydimethyl siloxane or polyoctylmethyl siloxane), polysulfones, polyethers (for example, a copolymer of poly(ethylene oxide) and poly(butylene therephthalate)), polycarbonates, poly(4-methyl-2-pentyne), poly-thrimethylsiyl-propyne, other appropriate materials, or combinations thereof.

Inert, dried air (e.g., dried ODA) exits WVT module 30 on first side 34 through inert line 38, where it is directed to a location requiring inert gas. For instance, the inert gas generated by system 10 can be used to passivate ullages for fuel tank inerting (FTI), to replace Halon and attendant tanks in cargo fire suppression, or to generate a sparging gas for fuel stabilization. These applications having varying requirements for oxygen content. The oxygen content of inert gas exiting system 10 through inert line 38 can be varied by altering amounts of voltage from power source 16 and rate of air flow from air source 12 entering EGS 20 with a flow control device (not shown).

Water vapor that migrated across membrane 32 of WVT module 30 makes its way out of WVT module 30 through water vapor line 40. Water vapor travels down water vapor line 40 to vacuum pump 42. Vacuum pump 42 generates a difference in oxygen partial pressure to dehumidify gas without humidity exchange between gas streams. Vacuum pump 42 drives water vapor from line 40 to line 43, where water vapor can condense to liquid water. Liquid water can flow through line 43 back to EGS 20. Additionally, make-up water can be added to EGS 20 via make-up water line 44. Recovery of water and some additional make-up water feed EGS 20 so that it continues to electrolyze water and produce oxygen-depleted air. However, EGS 20 does not need to be run entirely on make-up water if humidity is recovered from air cycling through WVT module 30.

Vacuum pump 42 works in conjunction with WVT module 30 to dry ODA entering WVT module 30. This removes sufficient humidity from the inert gas, and permits use of the inert gas in fuel tanks or other areas requiring inerting. A dry (operating fluid-free) vacuum pump such as a scroll or diaphragm vacuum pump can be used due to durability and long maintenance intervals. Alternatively, a desiccant, for example, a hygroscopic material such as silica, or activated charcoal, calcium sulfate, or molecular sieves such as zeolites, can be used.

Alternatively, a sweep gas can be used in lieu of vacuum pump 42 to dehumidify oxygen-depleted air from EGS 20. In the instance of a sweep gas, air from air source 12 entering EGS 20 is used as a sweep gas to recover humidity from inert gas exiting WVT module 30. This reduces the need for make-up water to EGS 20. Any water added to EGS 20, such as make-up water, must adhere to water purity standards (e.g., water conductivity below 0.1 µS/cm), which means it should be deionized. Water cycled back to EGS 20 through vacuum pump 42 (or alternatively a sweep gas) should already be deionized from earlier use in system 10, thus, further purification is not required.

In another alternative embodiment, an ejector (not shown) can serve as the vacuum source, replacing vacuum pump 42. The ejector can work in conjunction with WVT module 30 to dry ODA entering WVT module 30 by generating a difference in the partial pressure of water vapor to remove water from the inert gas stream. Motive fluid supplied to the ejector can be compressed air, such as, for example, bleed air from an engine compressor stage or from a load compressor. The motive fluid may be thermally regulated to be compatible with the WVT module if necessary, for example by using a heat exchanger cooled by ram air. The mixture of water vapor and motive fluid exiting the ejector can serve as the process air for EGS 20 by being directed to cathode 22.

Controller 46 interacts with air source 12, power source 16, EGS 20, WVT module 30, vacuum pump 42, and make-up water line 44. Thus, controller 46 controls input of air and voltage into EGS 20, in order to manipulate the amount of oxygen in resulting humid inert air, in addition to manipulating the actions of WVT module 30, vacuum pump 42, and the water supply.

Controller 46 is operatively coupled (e.g., electrically and/or communicatively) to components as depicted in FIG. 1 to send and/or receive data to control operation of these components. Controller 46 can include one or more processors and computer-readable memory encoded with instructions that, when executed by the one or more processors, cause controller 46 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of controller 46 can be configured to store information within controller 46 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller 46 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories. Controller 46 can be a stand-alone device dedicated to the operation of the inert gas generation system 10, or it can be integrated with another controller.

Controller 46 manipulates an amount of air entering system 10 from air source 12, an amount of power from power source 16 entering EGS 20, and thus the rate at which EGS 20 electrolyzes water at anode 24, consumes oxygen, and generates water at cathode 22, the function of WVT module 30, the function of vacuum pump 42, and the amount of make-up water cycled back into EGS 20.

Figure 2:
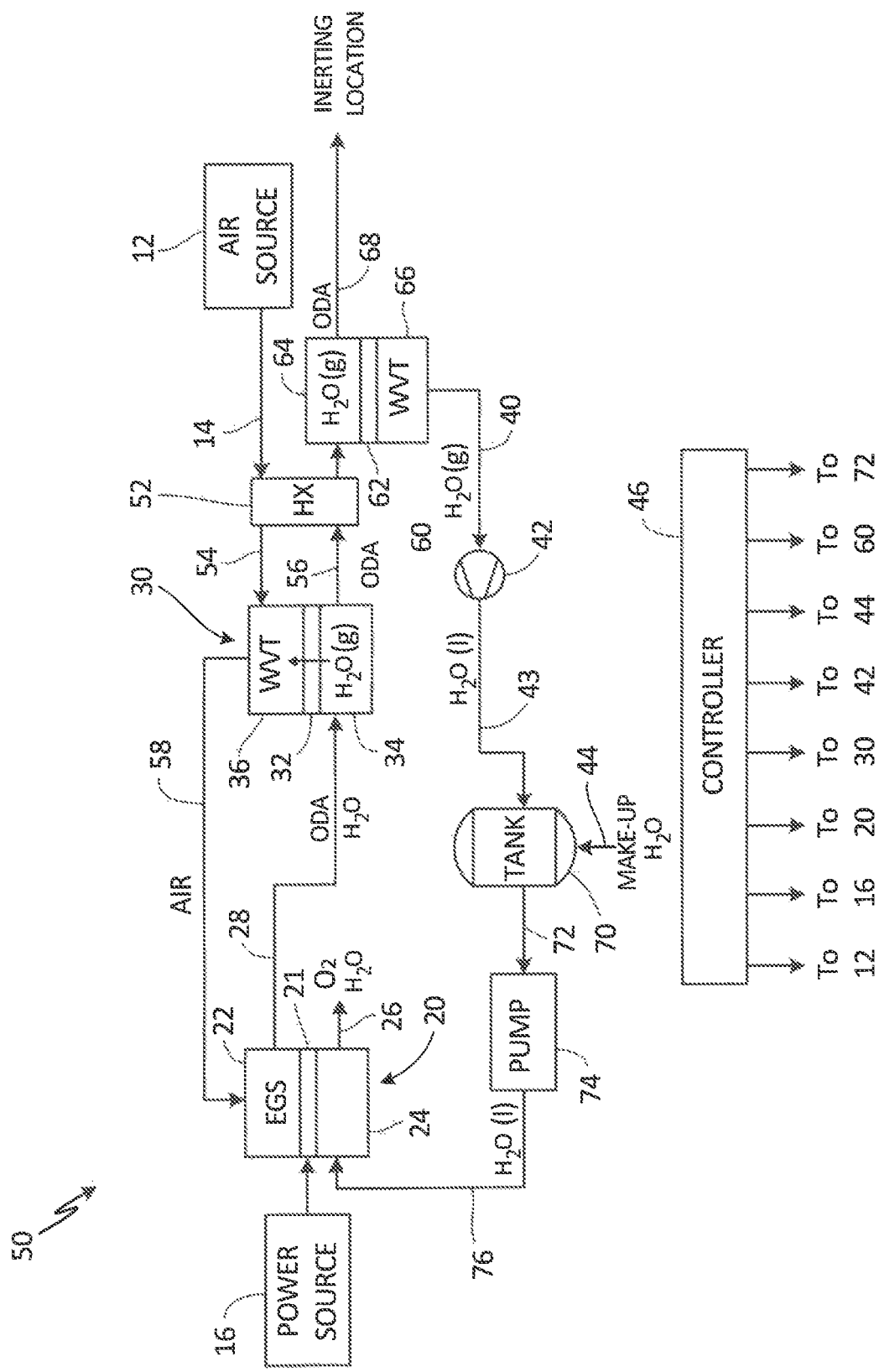
FIG. 2 is a schematic drawing of an inert gas generation and dehumidification system containing a second water vapor transport system.

FIG. 2 is a schematic drawing of inert gas generation and dehumidification system 50 containing heat exchanger 52, second water vapor transport module 60, and water tank 70 with pump 74. System 50 has the same components as system 10 in FIG. 1, connected in the same manner, except where discussed below. In addition to the components of system 10, system 50 contains heat exchanger 52, heat exchanger air line 54, WVT heat exchanger air line 56, WVT air return line 58, second water vapor transport (WVT) module 60 (containing membrane 62, first side 64 and second side 66), oxygen-depleted air line 68, water tank 70, water tank line 72, pump 74, and return line 76.

Heat exchanger 52 temperature conditions both oxygen-depleted air exiting first WVT module 30 and air from air source 12 leading back to EGS 20. Heat exchanger 52 is connected to WVT module 30 by lines 54 and 56. Line 54 transports air towards EGS 20, discussed in more detail below. Line 56 contains oxygen-depleted air (ODA) exiting first side 34 of WVT module 30. ODA flows down line 56 to heat exchanger 52, where it is temperature regulated before being flowed to second WVT module 60 for further dehumidification. In one embodiment, WVT module 30 and heat exchanger 52 are one and the same device.

Use of a heat recovery heat exchanger 52 allows for cooling of ODA prior to introduction to a fuel tank or other inerting location. In a fuel tank, this would reduce the vapor pressure of fuel in the ullage. Additionally, warming incoming air from air source 12 allows it to hold more moisture to keep EGS membrane 21 humidified because the amount of water that air can hold is a function of temperature.

WVT module 30 exchanges some heat as it functions. Thus, if ambient air (e.g., ram air) is used as air supply 12 during the cruise phase of flight, then cold air can freeze water crossing membrane 32 of first WVT module 30. To avoid freezing, heat exchanger 52 is placed upstream of WVT module 30 membrane 32 to recuperate some heat from ODA air exiting WVT module 30. Thus, heat exchanger 52 takes in ODA from WVT module 30 and regulates its temperature, sending ambient air from air source 12 through line 54 back towards WVT module 30.

Air line 14 connects directly to heat exchanger 52, where incoming air is temperature conditioned. After passing through heat exchanger 52, air from air source 12 flows through heat exchanger air line 54 to first WVT module 30, Where air is of an appropriate temperature for NWT module 30 to separate water vapor from incoming humid oxygen-depleted air. Air exits WVT module 30 from second side 36 and is routed down line 58 back to EGS 20.

Heat exchanger 52 recovers some heat, but incoming air from air source 12 may not recover all of the humidity from the outgoing ODA stream that was initially saturated. Thus, some loss of humidity may occur in the outgoing air stream. This may necessitate further water vapor removal from the ODA stream for some applications. This can be accomplished with second WVT module 60, vacuum pump 42. Alternatively, a desiccant wheel exchanging humidity between ingoing and outgoing streams, or an enthalpy wheel, exchanging heat and humidity between streams, could also be used.

In system 50, second WVT module 60 is downstream of the hot side of heat exchanger 52. Second WVT module 60 may be similar to WVT module 30 in construction and materials. Second WVT module 60 contains membrane 62, first side 64, and second side 66. Incoming ODA from heat exchanger 52 is further dehumidified as water vapor is drawn across membrane 62 to second side 66. Similar to first WVT module 30 in system 10, the resulting water vapor is flowed down line 40 towards vacuum pump 42. Dried, oxygen-depleted air (ODA) exits second WVT module 60 on first side 64 and is directed to a location requiring inerting.

Water vapor flows down line 40 and through vacuum pump 42. Depending on conditions downstream of vacuum pump 42, the water vapor may condense to liquid water and flow down line 43 to water tank 70. Water tank 70 and pump 74 aid in water recovery. Water tank 70 holds reserve water to be fed to EGS 20 for electrolysis. Liquid water is pumped out of water tank 70 down line 72 by pump 74, and then down line 76 back to EGS 20. Tank 70 allows for an extra supply of water to supplement water being recovered in system 50. Make-up water line 44 now feeds into tank 70 instead of directly to EGS 20.

Tank 70 enables system 10 to capture excess water under certain operating conditions (such as, for example, when EGS 20 is operating at lower temperatures) and also provide additional water to EGS 20. Use of tank 70 can minimize the amount of make-up water required. Preferably, no make-up water is required since water is neither consumed nor generated by either EGS 20 or WVT 30. If the water content in air source 12 is greater than the water content in the streams exiting the system through lines 26 and 28, then system 10 may actually accumulate water. The water in humid oxygen line 26 can also be recovered, at least in part, by a number of methods such as bubbling it through tank 70 (if the water in the tank is a lower temperature than humid oxygen in line 26), passing the water through a condenser, a desiccant, or another water vapor transport module.

Figure 3:
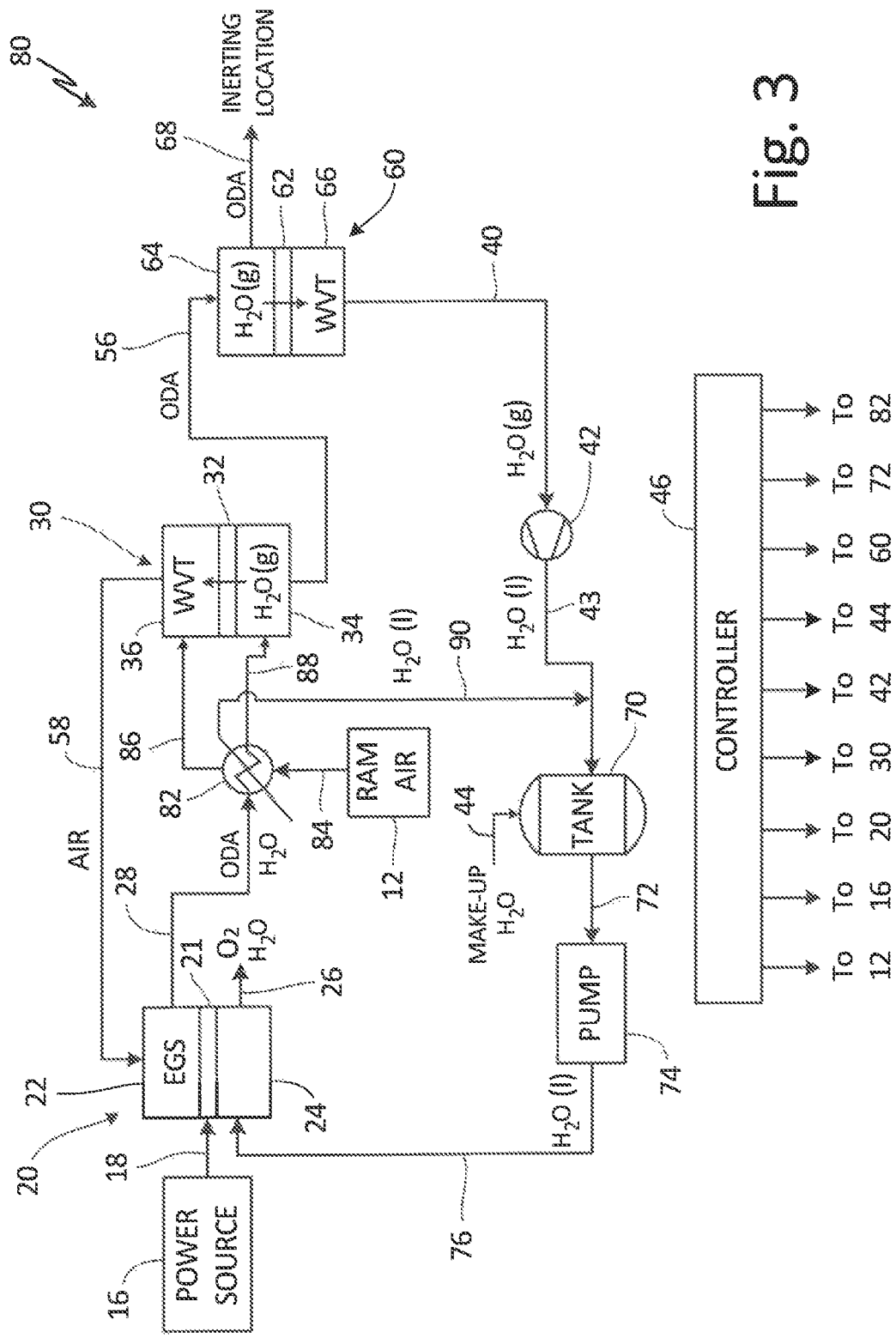
FIG. 3 is a schematic drawing of an inert gas generation and dehumidification system for aircraft with a second water vapor transport module and condensing heat exchanger.

FIG. 3 is a schematic drawing of inert gas generation and dehumidification system 80 for aircraft with condensing heat exchanger 82. System 80 is similar to systems 10 and 50, and is connected in the same way except where discussed below. System 80 includes condensing heat exchanger 82, ram air line 84, and lines 86 and 88.

Ram air source 12 replaces air source 12 of systems 10 and 50. Ram air does not need to be substantially pressurized in order to enter system 80. Ram air does not need to be substantially pressurized in order to enter system 80. Condensing heat exchanger 82 takes in ram air from source 12 and humid oxygen-depleted air from EGS 20 through line 28. Condensing heat exchanger 82 regulates the temperature of both the ram air and humid ODA, in addition to condensing water vapor from humid ODA. Regulated humid ODA is directed to first side 34 of WVT module 30. Ram air is directed through second side 36 of WVT module 30 before being fed back to EGS 20. Condensed water from condensing heat exchanger 82 is routed to water tank 70, before being routed back to BUS 20.

This inert gas generation and humidity control system allows for recovery of water from a water vapor transport module to run an electrochemical gas separator and produce dry, inert air without relying on pressurized air sources such as bleed air. Dried inert air can be used for fuel tank inerting, fire suppression, or other applications. There is a reduced need for make-up water in this system due to the at least partial recovery of water. This further minimizes costs associated with providing pure water to EGS 20. Preferably, the need for make-up water is reduced or eliminated, which can be realized by having a small water reservoir (e.g., tank) to enable the system to average out water-deficit and water-excess operating conditions. Inert gas for fire suppression must not necessarily be dry, however, recovering water from the inert gas using WVT 30 assists the water management of EGS 20. Finally, if the inert air is used for fuel tank inerting, then this system avoids the problem of inert gas generation systems that utilize catalytic oxidation and thereby expose fuel to carbon dioxide, which promotes corrosion in fuel tanks and absorbs into fuel possibly resulting in vapor lock in the fuel system. The systems taught herein do not expose fuel to elevated levels of carbon dioxide.

Discussion of Possible Embodiments

The following are non-exclusive descriptions of possible embodiments of the present invention.

A system for inerting gas includes an electrochemical gas separator configured to remove oxygen from air and produce oxygen-depleted air, a water vapor transport module configured to receive the oxygen-depleted air from the electrochemical gas separator and to dehumidify the oxygen-depleted air to produce dried oxygen-depleted air and water vapor, a drying mechanism downstream of the water vapor transport module, the drying mechanism configured to condense the water vapor and the dried oxygen-depleted air, and an inerting location configured to receive the dried oxygen-depleted air.

The system of the preceding paragraph can optionally include, additionally and/or alternatively, any one or more of the following features, configurations and/or additional components:

The system includes a heat exchanger in fluid communication with the water vapor transport module, the heat exchanger configured to provide heated air to the water vapor transport module.

The heat exchanger is configured to cool the dried oxygen-depleted air exiting the water vapor transport module.

The drying mechanism is a vacuum source or a sweep gas.

The system includes a water tank downstream of the drying mechanism, the water tank configured to collect condensed water vapor from the drying mechanism.

The water the water tank is designed to store water for use in the electrochemical gas separator.

The system includes a pump downstream of the drying mechanism, the pump configured to direct condensed water to the electrochemical gas separator.

The system includes an air source in fluid communication with the electrochemical gas separator.

The system includes a secondary water vapor transport system downstream of the water vapor transport module, the secondary water vapor transport system configured to receive the dried oxygen-depleted air from the water vapor transport module and configured to further dry the dried oxygen-depleted air.

The electrochemical gas separator includes an anode configured to electrolyze water, the anode situated inside the electrochemical gas separator on a first side, and a cathode configured to convert air to water vapor, the cathode situated inside the electrochemical gas separator on a second side opposite the first side.

A method includes flowing air into an electrochemical gas separator, electrolyzing the water in the electrochemical gas separator to produce humid oxygen, humid oxygen-depleted air, and water, flowing the humid oxygen-depleted air to a water vapor transport module, dehumidifying the humid oxygen-depleted air in the water vapor transport module using a drying mechanism to produce dried oxygen-depleted air and water to produce dried oxygen-depleted air, and sending the dried oxygen-depleted air to a location requiring inerting.

The method of the preceding paragraph can optionally include, additionally and/or alternatively, any one or more of the following features, configurations and/or additional components:

The method includes condensing humidity from the oxygen-depleted air to produce water.

The method includes flowing water from a water tank to the electrochemical gas separator for use in electrolysis.

The method includes flowing the water to the electrochemical gas separator.

The drying mechanism is a sweep gas to dry the dried oxygen-depleted air.

The drying mechanism is a vacuum source to dry the dried oxygen-depleted air.

The method includes heating air from an air source to produce heated air and flowing the heated air into the water vapor transport module to create a water gradient.

The method includes flowing the dried oxygen-depleted air through a heat exchanger to cool the dried oxygen-depleted air.

The method includes flowing the dried oxygen-depleted air through a drying device.

The method includes flowing ram air through a condensing heat exchanger to produce heated ram air, and flowing the heated ram air into the water vapor transport module to create a water gradient.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for inciting gas comprising:
   an air source;
   an electrochemical gas separator configured to remove oxygen from air received from the air source and produce oxygen-depleted air;
   a water vapor transport module configured to receive the oxygen-depleted air from the electrochemical gas separator and to dehumidify the oxygen-depleted air to produce dried oxygen-depleted air and water vapor;
   a vacuum pump downstream of the water vapor transport module, the vacuum pump configured to remove the water vapor;
   a heat exchanger in fluid communication with the water vapor transport module, wherein the heat exchanger is configured to heat the air received from the air source and to provide heated air to the water vapor transport module, and wherein the heat exchanger is configured to cool the dried oxygen-depleted air exiting the water vapor transport module; and
   an inerting location configured to receive the dried oxygen-depleted air.

2. The system of claim 1, further comprising a water tank downstream of the drying mechanism, the water tank configured to collect water from the drying mechanism and to send water to the electrochemical gas separator.

3. The system of claim 1, wherein the water vapor is routed back to the electrochemical gas separator.

4. The system of claim 1, further comprising a pump downstream of the vacuum pump, the pump configured to direct water to the electrochemical gas separator.

5. The system of claim 1, further comprising an air source in fluid communication with the electrochemical gas separator.

6. The system of claim 1, further comprising a secondary water vapor transport system downstream of the water vapor transport module, the secondary water vapor transport system configured to receive the dried oxygen-depleted air from the water vapor transport module and configured to further dry the dried oxygen-depleted air.

7. The system of claim 1, wherein the electrochemical gas separator comprises:
   an anode configured to electrolyze water, the anode situated inside the electrochemical gas separator on a first side; and
   a cathode configured to convert air to water vapor, the cathode situated inside the electrochemical gas separator on a second side opposite the first side.

8. A method comprising:
   heating air from an air source through a heat exchanger to produce heated air;
   flowing the heated air into an electrochemical gas separator;
   electrolyzing water in the electrochemical gas separator with the air to produce humid oxygen, heated humid oxygen-depleted air, and water;
   flowing the heated humid oxygen-depleted air to a water vapor transport module;
   dehumidifying the heated humid oxygen-depleted air in the water vapor transport module using a vacuum pump to produce dried oxygen-depleted air and water;
   flowing the dried oxygen-depleted air through a heat exchanger to cool the dried oxygen-depleted air; and
   sending the dried oxygen-depleted air to a location requiring inerting.

9. The method of claim 8, further comprising condensing humidity from the oxygen-depleted air to produce water.

10. The method of claim 8, further comprising flowing water from a water tank to the electrochemical gas separator for use in electrolysis.

11. The method of claim 8, further comprising flowing the water to the electrochemical gas separator.

12. The method of claim 8, further comprising flowing the heated air into the water vapor transport module to create a water gradient.

13. The method of claim 8, further comprising flowing the dried oxygen-depleted air through a drying device.

14. The method of claim 8, further comprising flowing ram air through a condensing heat exchanger to produce heated ram air, and flowing the heated ram air into the water vapor transport module to create a water gradient.

* * * * *

UNITED STATES PATENT AND TRADEMARK OFFICE
CERTIFICATE OF CORRECTION

| | |
|---|---|
| PATENT NO. | : 10,532,311 B2 |
| APPLICATION NO. | : 15/639587 |
| DATED | : January 14, 2020 |
| INVENTOR(S) | : Jonathan Rheaume and Michael L. Perry |

It is certified that error appears in the above-identified patent and that said Letters Patent is hereby corrected as shown below:

In the Specification

Column 6, Line 67 - Column 7, Line 2:
Delete "Ram air does not need to be substantially pressurized in order to enter system 80. Ram air does not need to be substantially pressurized in order to enter system 80."
Insert --Ram air does not need to be substantially pressurized in order to enter system 80.--

Column 9, Line 2:
Delete "inciting"
Insert --inerting--

Signed and Sealed this
Eighteenth Day of February, 2020

Andrei Iancu
*Director of the United States Patent and Trademark Office*